(12) United States Patent
Ikeda et al.

(10) Patent No.: US 9,331,551 B2
(45) Date of Patent: May 3, 2016

(54) CASE OF ELECTRIC ROTATING MACHINE

(75) Inventors: Chikako Ikeda, Utsunomiya (JP);
Norifumi Yasuda, Utsunomiya (JP);
Manabu Sakurada, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 13/813,078

(22) PCT Filed: Jan. 18, 2012

(86) PCT No.: PCT/JP2012/050942
§ 371 (c)(1),
(2), (4) Date: Jan. 29, 2013

(87) PCT Pub. No.: WO2012/111374
PCT Pub. Date: Aug. 23, 2012

(65) Prior Publication Data
US 2013/0328423 A1    Dec. 12, 2013

(30) Foreign Application Priority Data

Feb. 18, 2011 (JP) .................................. 2011-033526

(51) Int. Cl.
*H02K 9/19* (2006.01)
*H02K 5/20* (2006.01)
(52) U.S. Cl.
CPC ... *H02K 9/19* (2013.01); *H02K 5/20* (2013.01)
(58) Field of Classification Search
CPC .................................. H02K 9/19; H02K 5/20
USPC ........................................................... 310/54
IPC .................................................. H02K 9/19,5/20
See application file for complete search history.

(56) References Cited

U.S. PATENT DOCUMENTS 2,862,120 A * 11/1958 Onsrud ........................... 310/54
6,900,561 B2 * 5/2005 Vlemmings et al. ............ 310/59
(Continued)

FOREIGN PATENT DOCUMENTS

| CN | 08-214502 A | 8/1996 |
| CN | 1889334 A | 1/2007 |
| CN | 101087082 A | 12/2007 |

(Continued)

OTHER PUBLICATIONS

Machine Translation, Sasaki et al., JP 2007143247 A, Jun. 7, 2007.*
(Continued)

*Primary Examiner* — Thomas Truong
(74) *Attorney, Agent, or Firm* — Westerman, Hattori, Daniels & Adrian, LLP

(57) ABSTRACT

A case of an electric rotating machine, includes: a cooling passage which is provided inside the case along a circumferential direction of the case and through which a cooling fluid is able to flow; a cooling fluid inlet and a cooling fluid outlet which communicate with the cooling passage; and a rib which is provided inside the cooling passage, connect a wall portion on an inside in a radial direction of the case and a wall portion on an outside in the radial direction of the cooling passage along the circumferential direction, are arranged to be separated from each other in an axial direction of the case, and partition the cooling passage into a plurality of cooling passages.

13 Claims, 9 Drawing Sheets

(56) References Cited

U.S. PATENT DOCUMENTS

| | | | |
|---|---|---|---|
| 6,909,210 B1 * | 6/2005 | Bostwick | 310/52 |
| 2010/0033039 A1 | 2/2010 | Sakai et al. | |

FOREIGN PATENT DOCUMENTS

| | | |
|---|---|---|
| CN | 201270453 Y | 7/2009 |
| CN | 201355786 Y | 12/2009 |
| CN | 101656445 A | 2/2010 |
| CN | 2010-283929 A | 12/2010 |
| JP | 5-22901 A | 1/1993 |
| JP | 08-205474 A | 8/1996 |
| JP | 2007-143247 A | 6/2007 |
| JP | 2010-041835 A | 2/2010 |
| JP | 2010-206993 A | 9/2010 |
| JP | 2010-213402 A | 9/2010 |
| JP | 2010-273424 A | 12/2010 |
| JP | 2011-15578 A | 1/2011 |

OTHER PUBLICATIONS

Chinese Office Action, Chinese Patent Application No. 201280002567.1 dated Jul. 3, 2013.

Japanese Office Action, Japanese Patent Application No. 2012-225921 dated Oct. 15, 2013.

PCT/JP2012/050942 International Search Report Feb. 21, 2012.

* cited by examiner

CASE OF ELECTRIC ROTATING MACHINE

CROSS-REFERENCED TO RELATED APPLICATION

This application is a National Stage entry of International Application PCT/JP2012/050942, filed Jan. 18, 2012, which claims priority to Japanese Patent Application No. 2011-033526, filed Feb. 18, 2011, the disclosure of the prior applications are hereby incorporated in their entirety by reference.

TECHNICAL FIELD

The present invention relates to a case of an internal rotor type electric rotating machine.

Priority is claimed on Japanese Patent Application No. 2011-033526, filed on Feb. 18, 2011, the content of which is incorporated herein by reference.

BACKGROUND ART

An internal rotor type motor in which an annular stator is fixed to the inside of a case and a rotor is rotated inside the stator is known. The stator is configured by winding coils around a plurality of slots of a stator core, and the rotor having a permanent magnet is rotated by a rotating magnetic field generated by applying, for example, a three phase current to the coil.

When current flows through the coils of the stator, the coils and the stator core generate heat and thus the temperature of the stator core increases. For this, there is an electric rotating machine configured so that a cooling passage is provided inside the case without depending only on natural heat radiation to external air, and a cooling fluid is caused to flow through the cooling passage to transfer the heat of the stator core to the cooling fluid via the case, thereby actively suppressing temperature increase of the stator.

In the case having the cooling passage therein as described above, in order to increase the rigidity of the case, columnar supports that connect the inner wall and the outer wall of the case are distributed and arranged in the cooling passage. In addition, in order to prevent the surface vibration of the outer wall of the case, ribs are provided on the outer surface of the outer wall of the case (for example, refer to Patent Document 1).

CITATION LIST

Patent Document

[Patent Document 1] Japanese Unexamined Patent Application, First Publication No. 2010-41835

SUMMARY OF INVENTION

Technical Problem

However, in the structure in which the columnar supports are distributed and arranged in the cooling passage, core splitting becomes complex during casting, the number of processes of core sand drainage increases, and thus manufacturing cost increases. Furthermore, when the columnar supports are distributed and arranged in the cooling passage, it is difficult to control the flow direction of the cooling fluid that flows through the cooling passage.

The present invention has been made taking the foregoing circumstances into consideration, and an object thereof is to provide a case of an electric rotating machine capable of reducing cost while achieving an increase in rigidity and prevention of surface vibration, and of easily controlling the flow of a cooling fluid.

Solution to Problem

In order to accomplish the object of solving the problems, the present invention employs the following measures.

(1) That is, according to an aspect of the present invention, a case of an electric rotating machine is provided which is disposed on an outer peripheral side of a stator of an internal rotor type electric rotating machine and which has a cylindrical shape, including: a cooling passage which is provided inside the case along a circumferential direction of the case and through which a cooling fluid is able to flow; a cooling fluid inlet and a cooling fluid outlet which communicate with the cooling passage; and a rib which is provided inside the cooling passage, connects a wall portion on an inside in a radial direction of the case and a wall portion on an outside in the radial direction of the case, along the circumferential direction, are arranged to be separated from each other in an axial direction of the case, and partition the cooling passage into plural, wherein the cooling fluid inlet is disposed such that a center axis thereof to be parallel to the axial direction of the case, and communicates with the cooling passage which is disposed on one end of the case in an axial direction from among the cooling passages partitioned by the rib, and the rib has an openings that penetrates the case on an extension of the center axis of the cooling fluid inlet from one side of the case in a direction along the center axis in the cooling passage to the other side of the case in the direction along the center axis.

(2) In the case of an electric rotating machine described in (1), the rib may be provided with plural, the openings respectively provided in the ribs may form a circle about the extension of the center axis of the cooling fluid inlet, and opening areas of the openings may be reduced from the opening of the rib disposed on the one side of the case in the direction along the center axis to the opening of the rib disposed on the other side of the case in the direction along the center axis.

(3) In the case of an electric rotating machine described in (1), the rib may be provided with plural, and centers of the openings respectively provided in the ribs may be gradually shifted in the circumferential direction from the opening of the rib disposed on the one side of the case in the direction along the center axis to the opening of the rib disposed on the other side of the case in the direction along the center axis.

(4) In the case of an electric rotating machine described in any one of (1) to (3), the rib may have second opening that penetrate at position in the circumferential direction between the cooling fluid inlet and the cooling fluid outlet from the one side of the case in the axial direction to the other side of the case in the axial direction in the cooling passage, and expansion chambers which communicate with the cooling passage may be provided in vicinities of the second openings.

Advantageous Effects of Invention

In the case of the electric rotating machine described in (1), the wall portion on the inside in the radial direction of the cooling passage and the wall portion on the outside in the radial direction are connected by the ribs along the circumferential direction. Therefore, the rigidity of the case is enhanced, and the surface vibration of the outer peripheral portion of the case may be suppressed. In addition, the structure is only provided with the ribs along the circumferential direction inside the cooling passage, and thus the shape of the cooling passage is simplified. Therefore, core splitting during casting and sand drainage of the core are facilitated, and thus the residual sand amount is significantly reduced. As a result, the number of sand drainage processes may be reduced, and production cost may be reduced.

Moreover, since the ribs are provided along the circumferential direction, the cooling water heat transfer area of the ribs increases. In addition, since the ribs are arranged to be separated from each other in the axial direction of the case and thus the cooling passages are partitioned into the plurality of cooling passages, the cooling fluid easily flows in the circumferential direction and thus pressure loss is reduced. As a result, cooling ability is enhanced.

Furthermore, since the ribs are provided with the openings on the extension of the center axis of the cooling fluid inlet, the cooling fluid that flows in from the cooling fluid inlet is distributed in the center axis direction by passing through the openings and is further distributed in the circumferential direction. Therefore, the cooling fluid may be distributed to the fluid passages partitioned by the ribs.

In addition, the flow velocity of the cooling fluid may be increased by reducing the height of the ribs, thereby enhancing the cooling ability. In addition, a reduction in size and weight of the case may be achieved by reducing the height of the ribs, and moreover, a reduction in size and weight of the electric rotating machine may be achieved.

In the case of the electric rotating machine described in (2), the cooling fluid that flows in from the cooling fluid inlet may be uniformly distributed in the center axis direction.

In the case of the electric rotating machine described in (3), flow rate adjustment in the circumferential direction of the cooling fluid that flows in from the cooling fluid inlet is possible.

In the case of the electric rotating machine described in (4), the cooling fluid that flows through the cooling passage flows into the expansion chambers and becomes turbulent, and thus cooling of the vicinity of the expansion chambers may be accelerated.

DESCRIPTION OF EMBODIMENTS

Hereinafter, a case of an electric rotating machine according to an embodiment of the present invention will be described with reference to FIGS. 1 to 9. In this embodiment, the electric rotating machine is an embodiment of a motor, and particularly, an embodiment of a motor mounted in a vehicle as a drive source for driving.

Initially, the case of the electric rotating machine according to the first embodiment will be described with reference to FIGS. 1 to 7.

Figure 1:
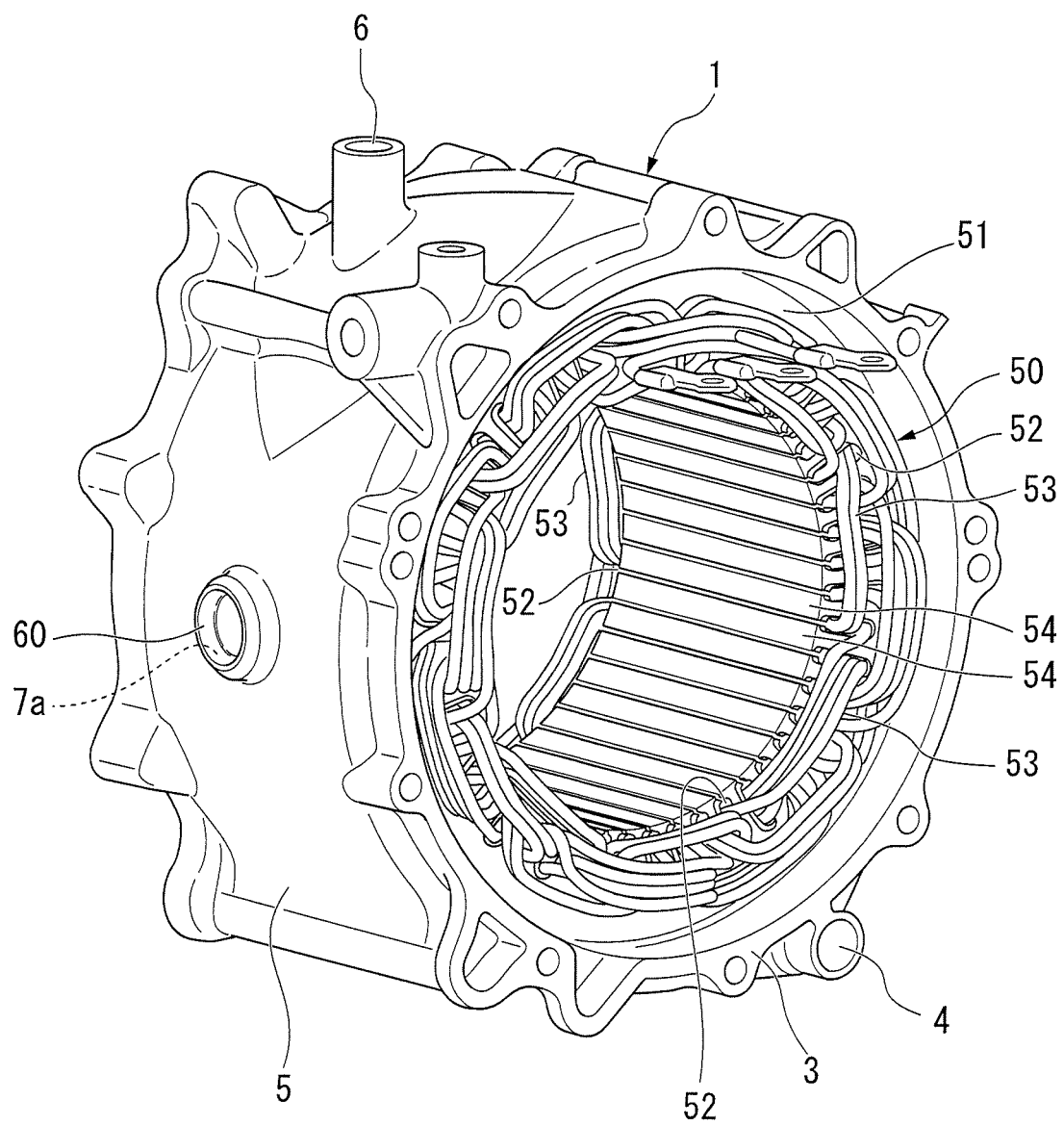
FIG. 1 is a perspective view of the external form of a stator and a case of an electric rotating machine according to a first embodiment.

In FIG. 1, reference sign 1 denotes the case of an internal rotor type motor (electric rotating machine). Reference sign 50 denotes a stator of the motor, and the stator 50 is fixed to the inside of the case 1. That is, the case 1 is disposed outside the stator 50.

Figure 2:
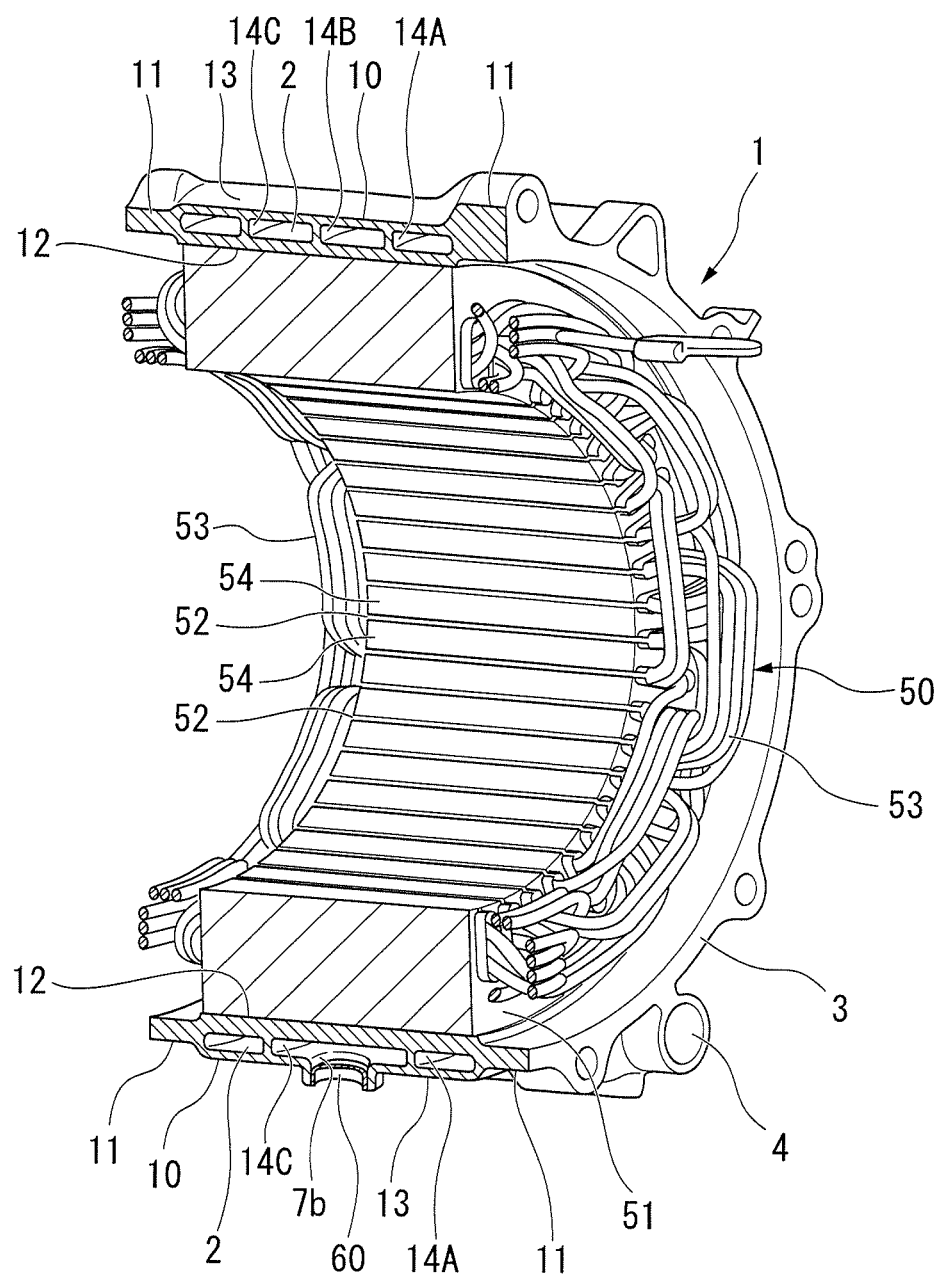
FIG. 2 is a cross-sectional view of the stator and the case of the electric rotating machine according to the first embodiment.

As illustrated in FIGS. 1 and 2, the stator 50 is constituted by a plurality of teeth 54 formed to protrude inward in the radial direction from an annular stator core 51, a plurality of slots 52 formed between the adjacent teeth 54 and 54, and a plurality of coils 53 wound around the plurality of slots 52. A rotor (not shown) is disposed inside the stator 50, and a rotating magnetic field is generated by applying a three phase current to the coil 53, thereby rotating the rotor.

The case 1 is made of aluminum and is manufactured by aluminum die casting, gravity casting, or the like. The case 1 has a ring shape surrounding the outer periphery of the stator 50, and the axial length of the case 1 is greater than the axial length of the stator core 51. In this embodiment, the axial direction of the case 1 is aligned with the axial direction (the axial direction of the stator 50) of the rotor.

Figure 3:
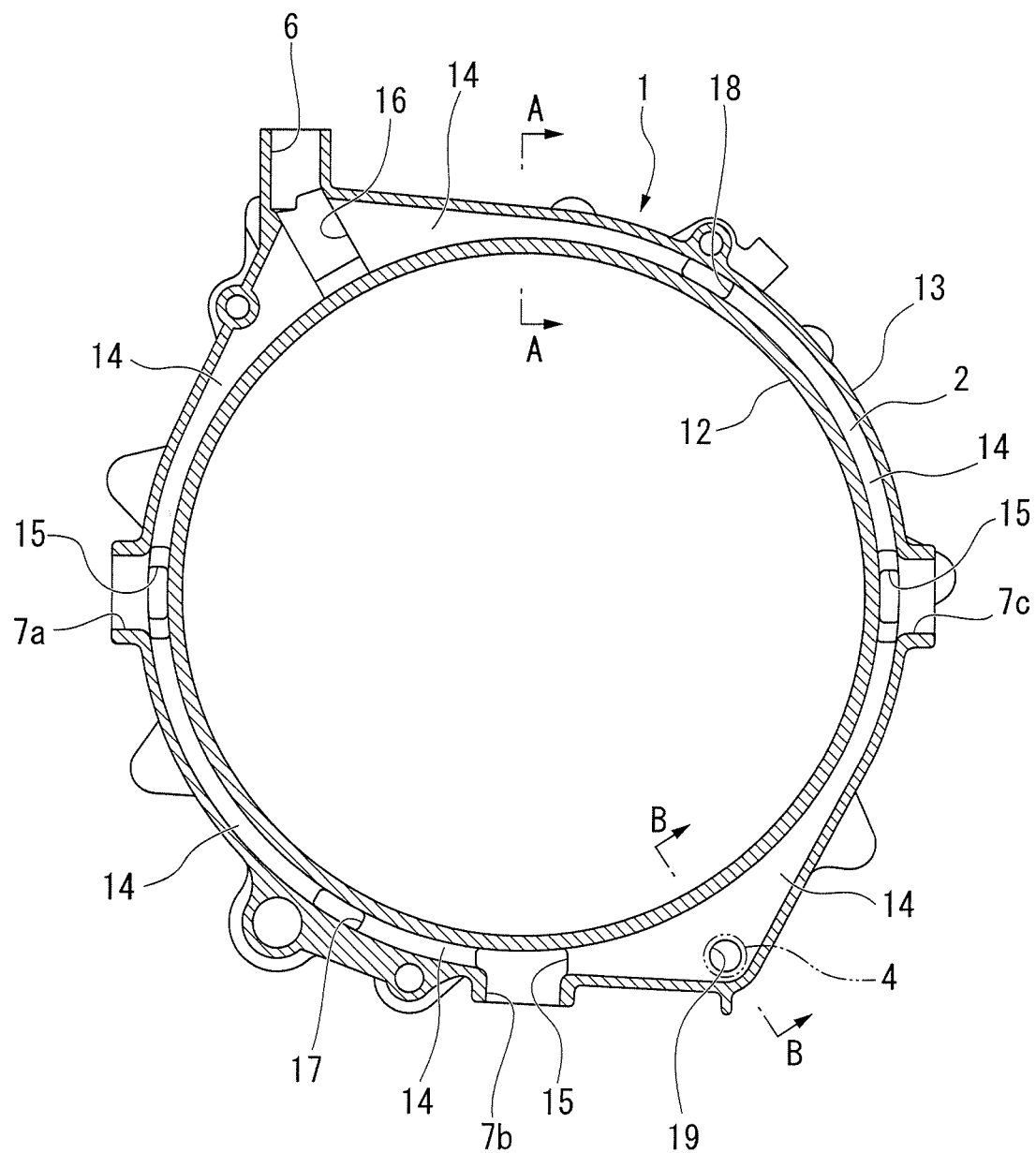
FIG. 3 is an entire cross-sectional view taken along the direction orthogonal to the axial direction of the case of the electric rotating machine according to the first embodiment.

As illustrated in FIGS. 2 and 3, a cooling passage 2 through which cooling water (cooling fluid) is able to flow is formed inside the case 1. In addition, in an end face 3 on one end in the axial direction of the case 1, a cooling water inlet hole (cooling fluid inlet) 4 for introducing the cooling water is provided so that the center axis thereof is arranged in parallel to the axial direction of the case 1. At a part which is substantially at the center in the axial direction of an outer peripheral surface 5 of the case 1 and is separated from the cooling water inlet hole 4 by about 180 degrees in the circumferential direction, a cooling water outlet hole (cooling fluid outlet) 6 for discharging the cooling water is provided so that the center axis thereof is arranged at right angle from the axial direction of the case 1. The cooling water inlet hole 4 and the cooling water outlet hole 6 communicate with the cooling passage 2.

The cooling passage 2 is formed by removing a sand mold core set in a mold when the case 1 is casted. In the outer peripheral surface 5 of the case 1, three core support holes 7*a*, 7*b*, and 7*c* (hereinafter, referred to as "core support holes 7" in a case where no distinguishment is needed) for supporting the positioning of the core in the radial direction in the mold are provided at 90 degree intervals in the circumferential direction. The core support hole 7*b* disposed at the center in the circumferential direction from among the three core support holes 7*a*, 7*b*, and 7*c* is disposed to be separated from the cooling water inlet hole 4 by about 30 degrees in the circumferential direction. The other core support holes 7*a* and 7*c* are disposed to be separated from the cooling water outlet hole 6 and the cooling water inlet hole 4 by about 60 degrees in the circumferential direction. The core support holes 7 communicate with the cooling passage 2 and also function as sand discharge holes for discharging sand of the core after casting.

As illustrated in FIGS. 1 and 2, the core support holes 7 are blocked by caps 60 when the stator 50 becomes the finished product.

Figure 4:
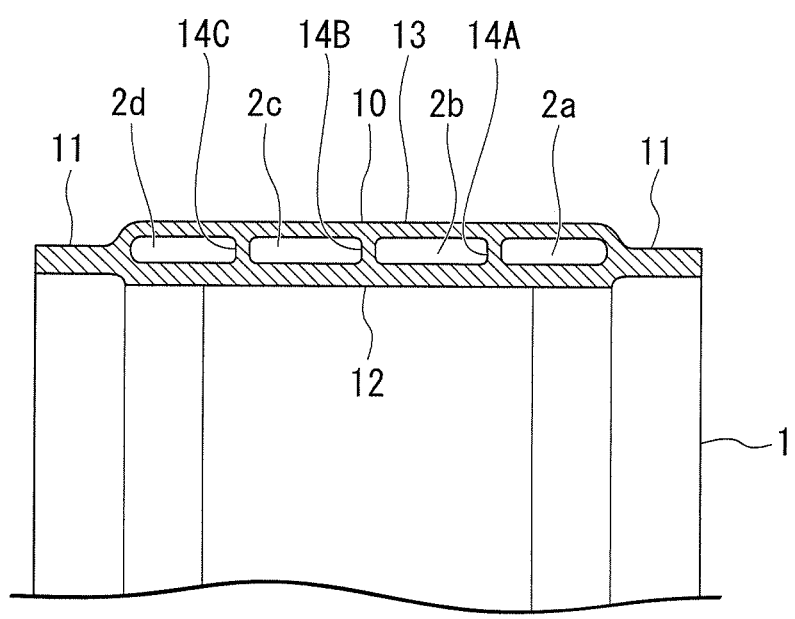
FIG. 4 is a cross-sectional view taken along line A-A of FIG. 3.
Figure 5:
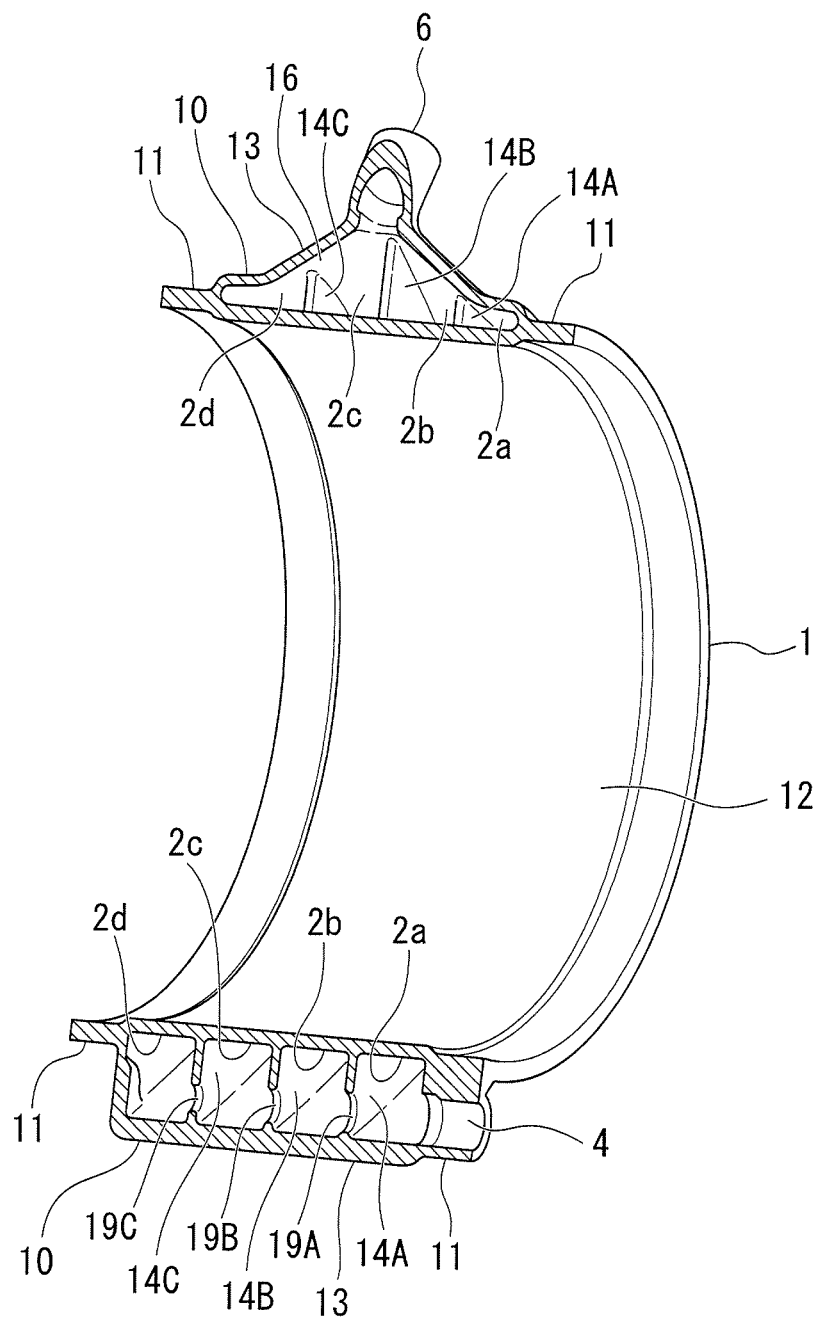
FIG. 5 is a perspective view taken along the diameter direction at positions including a cooling fluid inlet and a cooling fluid outlet in the case of the electric rotating machine according to the first embodiment.
Figure 6:
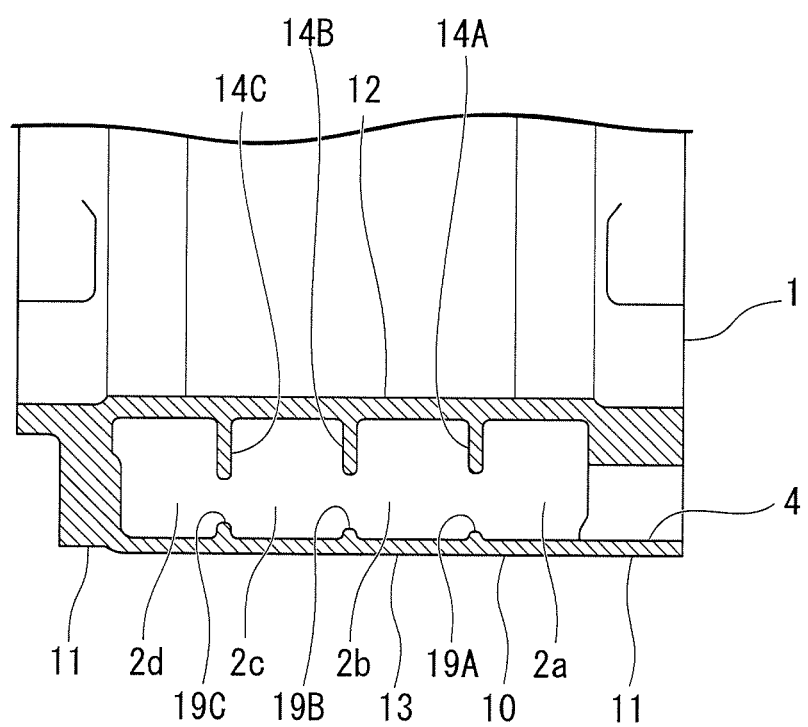
FIG. 6 is a cross-sectional view taken along line B-B of FIG. 3.

The cooling passage 2 will be described in detail with reference to FIGS. 3 to 6. FIG. 3 is an entire cross-sectional view taken along the direction orthogonal to the axial direction of the case 1. FIG. 4 is a cross-sectional view taken along line A-A of FIG. 3. FIG. 5 is a perspective view taken along the diameter direction at the positions including the cooling water inlet hole 5 and the cooling water outlet hole 7 of the case 1. FIG. 6 is a cross-sectional view taken along line B-B of FIG. 3.

As illustrated in FIGS. 2 and 4, the case 1 has a stator mounting portion 10 formed at the center portion in the axial direction, and connection end portions 11 and 11 provided on both sides in the axial direction from the stator mounting portion 10. The cooling passage 2 is formed inside the stator mounting portion 10 and is formed by being surrounded by an inside wall portion 12 formed on the inner side of the case 1 in the radial direction than the cooling passage 2, an outside wall portion 13 formed on the outer side of the case 1 in the radial direction, and the connection end portions 11 and 11 on both sides in the axial direction, thereby forming a ring shape.

The thickness of the cooling passage 2, that is, the intervals between the inside wall portion 12 and the outside wall portion 13 in the vicinities of the cooling water inlet hole 4 and the cooling water outlet hole 6 are greater than those at other positions in the circumferential direction as illustrated in FIGS. 3 and 5. Parts other than the vicinities of the cooling water inlet hole 4 and the cooling water outlet hole 6 have the same dimensions even in both the circumferential direction and the axial direction.

The inside diameter of the inside wall portion 12 in the stator mounting portion 10 is slightly smaller than the inside diameter of the connection end portion 11. The stator 50 is fitted and fixed to the inside wall portion 12 through a method such as shrink-fitting so that the inner peripheral surface of the inside wall portion 12 and the outer peripheral surface of the stator core 51 come into surface contact with each other. As the inner peripheral surface of the inside wall portion 12 and the outer peripheral surface of the stator core 51 come into surface contact with each other, the thermal conductivity between the stator core 51 and the case 1 is enhanced. As a result, the heat of the stator core 51 is easily transferred to the cooling water or air through the case 1, and thus cooling performance is enhanced.

As illustrated in FIGS. 2, 4, and 5, the cooling passage 2 is divided into four parts in the axial direction by three ribs 14A, 14B, and 14C (hereinafter, referred to as "ribs 14" in a case where no distinguishment is needed) arranged to be separated from each other in the axial direction of the case 1. Hereinafter, in the description, in a case where distinguishment is needed, cooling passages 2a, 2b, 2c, and 2d are distinguished. The ribs 14 connect the inside wall portion 12 and the outside wall portion 13 along the circumferential direction. The adjacent ribs 14 are arranged to be parallel to each other.

Each of the ribs 14 is divided into a plurality of parts in the circumferential direction. This is described in detail with reference to FIG. 3. Each of the ribs 14 is provided with openings (second openings) 15 formed at positions where the core support holes 7a, 7b, and 7c are disposed, an opening 16 formed at a position where the cooling water outlet hole 6 is disposed, an opening 17 formed between the openings 15 and 15, and an opening 18 formed between the opening 15 and the opening 16. The six openings 15, 16, 17, and 18 penetrate through each of the ribs 14 in the axial direction, and accordingly, each of the ribs 14 is divided into six parts in the circumferential direction.

The ribs 14A, 14B, and 14C are respectively provided with circular through-holes (openings) 19A, 19B, and 19C (hereinafter, referred to as "through-holes 19" in a case where no distinguishment is needed) for cooling water distribution formed to penetrate therethrough in the center axis direction on an extension of the center axis of the cooling water inlet hole 4. The center of each of the through-holes 19 is positioned on the extension of the center axis of the cooling water inlet hole 4.

As illustrated in FIGS. 5 and 6, when the opening areas of the through-holes 19A, 19B, and 19C are compared, the opening area of the through-hole 19A of the rib 14A disposed on the closest side to the cooling water inlet hole 4 is greatest. The opening area of the through-hole 19B of the rib 14B disposed in the middle of the center axis direction is smaller than the opening area of the through-hole 19A, and the opening area of the through-hole 19C of the rib 14C disposed to be farthest from the cooling water inlet hole 4 is smaller than the opening area of the through-hole 19B. That is, the opening areas of the through-holes 19 decrease toward a separated place from the cooling water inlet hole 4 along the center axis direction. The opening area ratio of the through-holes may be freely set.

For example, in a case where a uniform amount (the same flow rate) of cooling water is to flow through the cooling passages 2a, 2b, 2c, and 2d divided into four parts in the axial direction, assuming that the opening area of the cooling water inlet hole 4 is S, the opening area of the through-hole 19A may be ($3/4$)S, the opening area of the through-hole 19B may be ($1/2$)S, and the opening area of the through-hole 19C may be ($1/4$)S.

Figure 7:
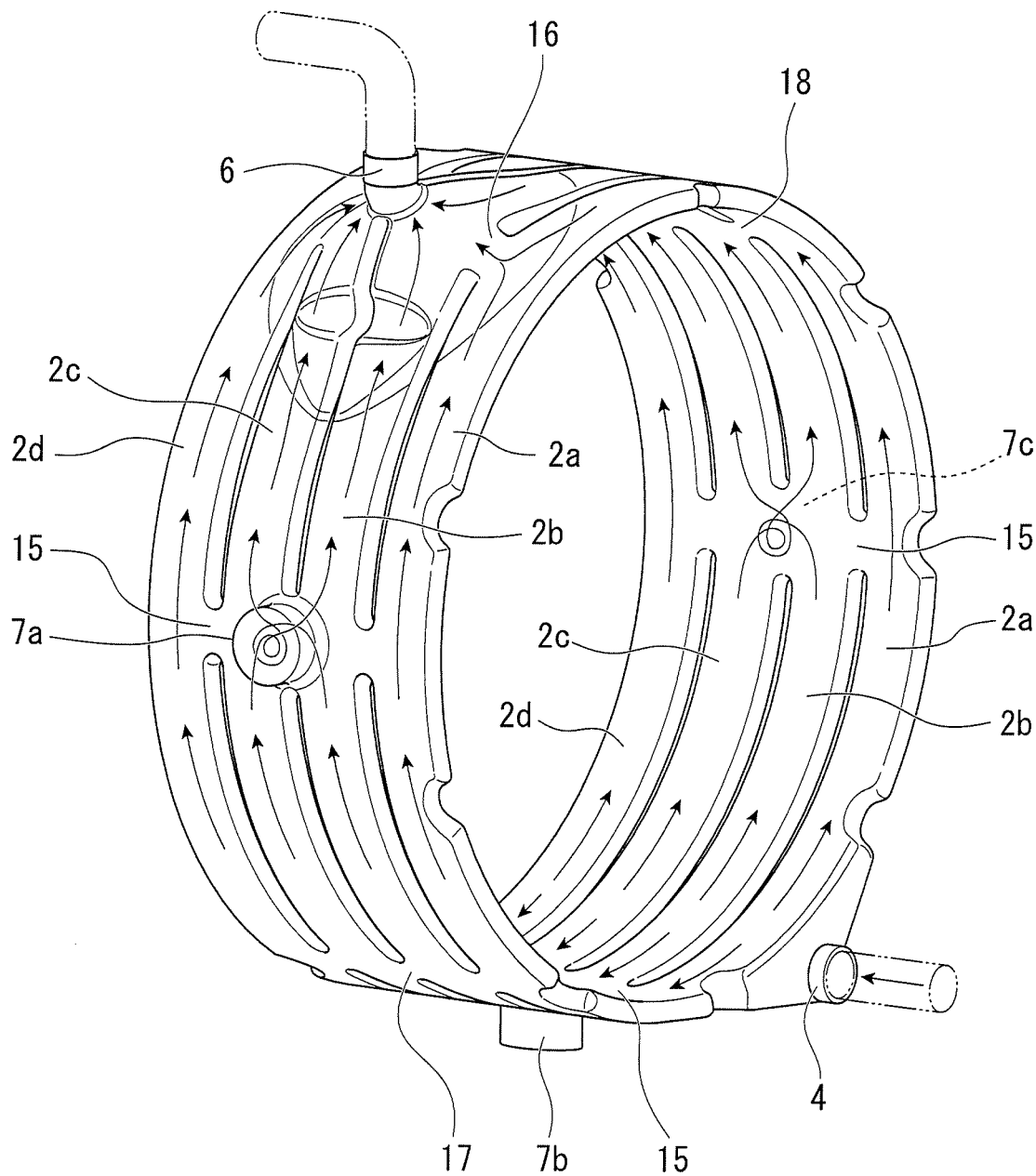
FIG. 7 is a perspective view illustrating the shape of a cooling passage in the case of the electric rotating machine according to the first embodiment.

FIG. 7 is a perspective view illustrating only the fluid passage 2. The flow of the cooling water in the case 1 will be described with reference to FIG. 7.

The cooling water that flows in from the cooling water inlet hole 4 flows into the first cooling passage 2a closest to the cooling water inlet hole 4. A portion of the cooling water that flows into the first cooling passage 2a branches off into two left and right streams along the circumferential direction of the first cooling passage 2a and flows toward the cooling water outlet hole 6. The cooling water that does not flow in the circumferential direction of the first cooling passage 2a flows into the second cooling passage 2b through the through-hole 19A of the rib 14A. A portion of the cooling water that flows into the second cooling passage 2b branches off into two left and right streams along the circumferential direction of the second cooling passage 2b and flows toward the cooling water outlet hole 6. The cooling water that does not flow in the circumferential direction of the second cooling passage 2b flows into the third cooling passage 2c through the through-hole 19B of the rib 14B. A portion of the cooling water that flows into the third cooling passage 2c branches off into two left and right streams along the circumferential direction of the third cooling passage 2c and flows toward the cooling water outlet hole 6. The cooling water that does not flow in the circumferential direction of the third cooling passage 2c flows into the fourth cooling passage 2d through the through-hole 19C of the rib 14C, branches off into two left and right streams along the circumferential direction of the fourth cooling passage 2d, and flows toward the cooling water outlet hole 6.

That is, since the through-holes 19A, 19B, and 19C are provided in the ribs 14A, 14B, and 14C on the extension of the center axis of the cooling water inlet hole 4, the cooling water that flows in from the cooling water inlet hole 4 may be distributed in the center axis direction by passing through the through-holes 19A, 19B, and 19C. Moreover, since the ribs 14A, 14B, and 14C are provided over the entire periphery along the circumferential direction of the case 1, the cooling water may be distributed in the circumferential direction.

At the positions in the circumferential direction where the core support holes 7a, 7b, and 7c are disposed, the cooling passages 2b and 2c communicate with each other through the openings 15. Even in a state where the caps 60 are mounted to the core support holes 7a, 7b, and 7c, parts corresponding to the core support holes 7a, 7b, and 7c are swollen out in the radial direction as expansion chambers. Therefore, as illustrated in FIG. 7, the cooling water that flows through the cooling passages 2b and 2c flows into the core support holes 7a, 7b, and 7c and generates turbulence. As a result, the applicant clarifies from the analysis result that the cooling effect increases in the expansion chambers (core support holes 7a, 7b, and 7c).

According to the case 1 of the motor configured as described above, since the inside wall portion 12 and the outside wall portion 13 are connected substantially over the entire periphery along the circumferential direction by the ribs 14A, 14B, and 14C in the stator mounting portion 10 having the cooling passage 2 formed therein, the rigidity of the case 1 increases, and the surface vibration of the outer peripheral portion of the case 1 may be suppressed.

In addition, the structure is only provided with the ribs 14A, 14B, and 14C along the circumferential direction inside the cooling passage 2, and thus the shape of the cooling passage 2 is simplified. Therefore, core splitting during casting is facilitated, sand drainage of the core is facilitated, and the residual sand amount is reduced. As a result, the number of sand drainage processes may be reduced, and production cost may be reduced.

In addition, since the ribs 14A, 14B, and 14C are provided substantially over the entire periphery along the circumferential direction, the cooling water heat transfer area of the ribs 14A, 14B, and 14C increases. In addition, since the ribs 14A, 14B, and 14C are arranged to be separated from each other in the axial direction of the case 1 and thus the cooling passages 2 are partitioned into the four cooling passages 2a, 2b, 2c, and 2d, the cooling water easily flows in the circumferential direction and thus pressure loss is reduced. As a result, cooling ability is enhanced.

In addition, the flow velocity of the cooling water may be increased by reducing the height of the ribs 14, thereby enhancing the cooling ability. In addition, a reduction in size and weight of the case 1 may be achieved by reducing the height of the ribs 14, and moreover, a reduction in size and weight of the motor may be achieved.

In addition, since the ribs 14 are provided with the through-holes 19 on the extension of the center axis of the cooling water inlet hole 4, the cooling water that flows in from the cooling water inlet hole 4 is distributed in the center axis direction by passing through the through-holes 19 and is further distributed in the circumferential direction. Therefore, the cooling water may be distributed to the fluid passages 2a, 2b, 2c, and 2d partitioned by the ribs 14.

As described above, the opening area ratio of the through-holes 19A, 19B, and 19C may be freely set depending on the flow rate distribution method. For example, in the case of the electric rotating machine according to the first embodiment, the opening area of the through-hole 19B at the center may be set to be greatest to cause a larger amount of cooling water to flow through the cooling passages 2b and 2c than the cooling passages 2a and 2b. That is, flow rate adjustment may be facilitated by the sizes of the through-holes 19 provided in the ribs 14 when the cooling water is distributed in the axial direction.

In addition, as described above, the cooling effect may be increased in the expansion chambers (core support holes 7a, 7b, and 7c).

Next, a case 1 of an electric rotating machine according to a second embodiment will be described with reference to FIGS. 8 and 9.

The case 1 of the electric rotating machine according to the second embodiment is different from the case of the electric rotating machine according to the first embodiment in the shapes of the through-holes 19A, 19B, and 19C provided in the ribs 14A, 14B, and 14C. Since other configurations are the same as those of the case of the electric rotating machine according to the first embodiment, description thereof will be omitted. Only differences will be described with reference to FIGS. 8 and 9.

Figure 8:
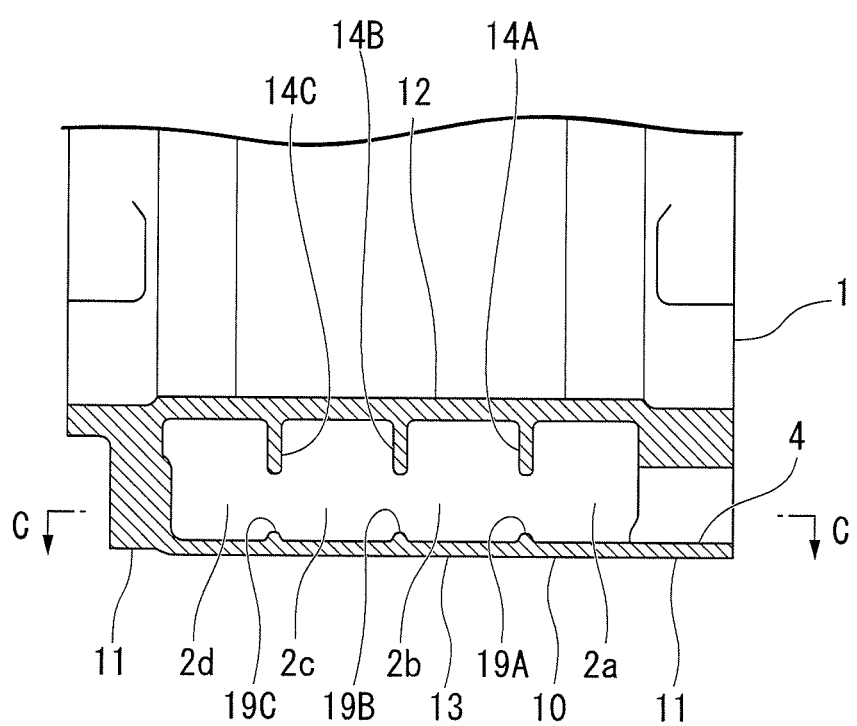
FIG. 8 is a cross-sectional view corresponding to FIG. 6 in a case of an electric rotating machine according to a second embodiment.

FIG. 8 is a cross-sectional view corresponding to FIG. 6 in the case of the electric rotating machine according to the first embodiment. FIG. 9 is a diagram schematically illustrating the C-C cross-section of FIG. 8.

The case of the electric rotating machine according to the second embodiment is different from the case of the electric rotating machine according to the first embodiment in that the inside diameters of the cooling water inlet hole 4 and the through-holes 19A, 19B, and 19C formed in the ribs 14A, 14B, and 14C are the same. In addition, although the through-holes 19A, 19B, and 19C are arranged to overlap in the center axis direction including the extension of the center axis of the cooling water inlet hole 4, the centers of the holes 4, 19A, 19B, and 19C are gradually shifted in the same direction as the circumferential direction, which is the difference from the case of the electric rotating machine according to the first embodiment.

Figure 9:
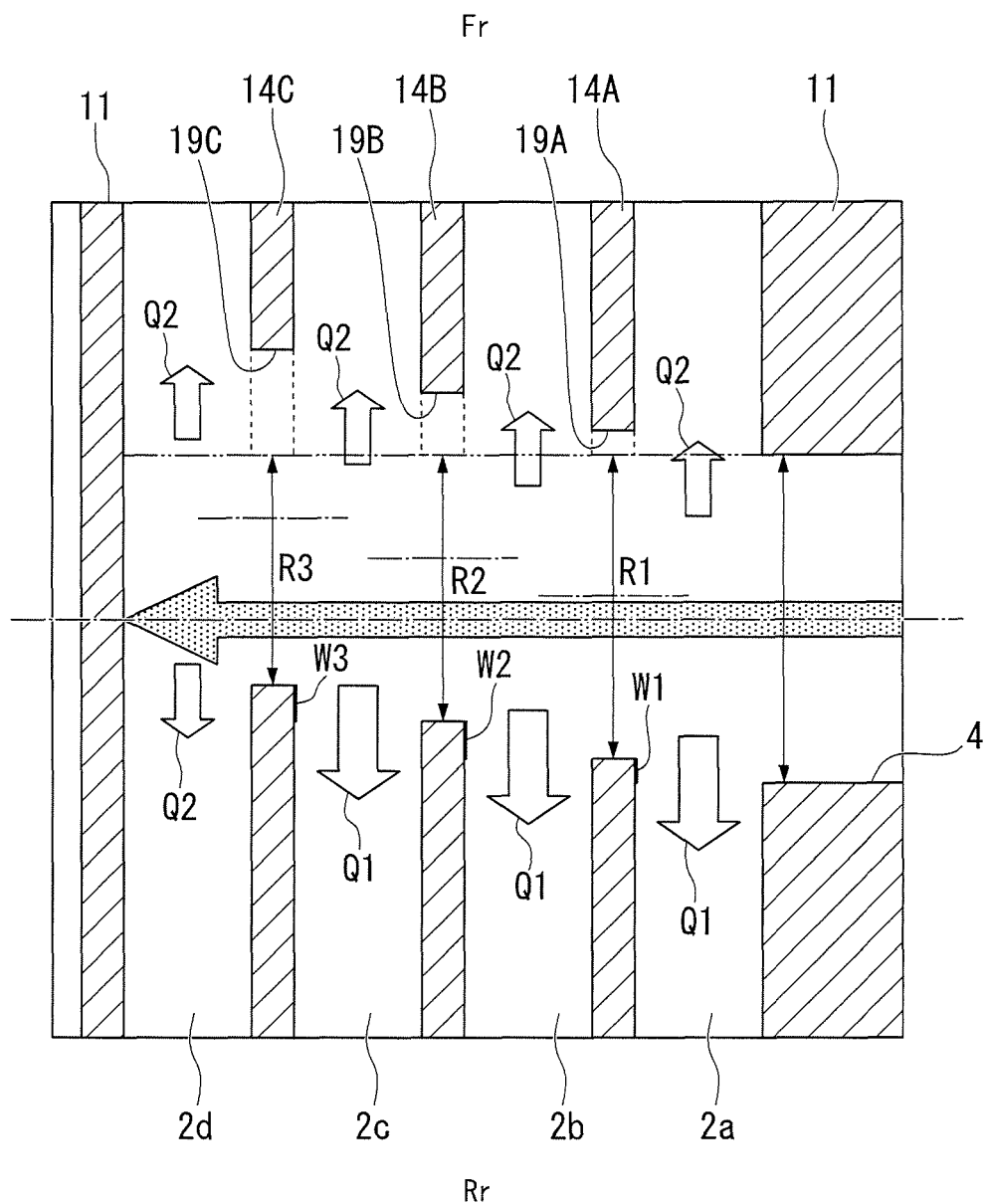
FIG. 9 is a diagram schematically illustrating the C-C cross-section of FIG. 8.

When the through-holes 19A, 19B, and 19C are formed as described above, the actual openings of the through-holes 19A, 19B, and 19C are narrowed as shown by the solid line arrows R1, R2, and R3 in FIG. 9. Therefore, the actual opening area of the through-hole 19A may be caused to be smaller than the opening area of the cooling water inlet hole 4. The actual opening area of the through-hole 19B may be caused to be smaller than the actual opening area of the through-hole 19A, and the actual opening area of the through-hole 19C may be caused to be smaller than the actual opening area of the through-hole 19B. That is, even in the case of the case of the electric rotating machine according to the second embodiment, as in the case of the electric rotating machine according to the first embodiment, the cooling water may be distributed in the axial direction at a predetermined flow rate ratio (including equal ratio).

When the cooling water flows from the cooling water inlet hole 4 into the cooling passage 2a, the cooling water collides with a protruding portion W1 that further protrudes in the circumferential direction than the cooling water inlet hole 4 in the rib 14A. Therefore, a flow rate Q1 of the cooling water that flows through the cooling passage 2a extending in the circumferential direction on a side having the protruding portion W1 becomes greater than a flow rate Q2 of the cooling water that flows through the cooling passage 2a extending on the opposite side in the circumferential direction.

A protruding portion W2 that further protrudes in the circumferential direction than the through-hole 19A in the rib 14B and a protruding portion W3 that further protrudes in the circumferential direction than the through-hole 19B in the rib 14C have the same action. That is, the flow rate Q1 of the cooling water that flows through the cooling passages 2b and 2c extending in the circumferential direction on the side having the protruding portions W2 and W3 becomes greater than the flow rate Q2 of the cooling water that flows through the cooling passages 2b and 2c extending on the opposite side in the circumferential direction.

FIG. 9 illustrates a case where the cooling water is equally distributed in the axial direction of the case 1. In FIG. 9, a case where the axial direction of the case 1 is aligned with a direction in which the vehicle axis extends, one side of the radial direction of the case 1 is disposed on the vehicle body forward side (Fr), and the other side thereof is disposed on the vehicle body rear side (Rr) is illustrated. In this case, the cooling ability of a part disposed on the vehicle body rear side in the case 1 becomes greater than the cooling ability of a part disposed on the vehicle body forward side. That is, by providing the protruding portions W1, W2, and W3 in the ribs 14A, 14B, and 14C, flow rate adjustment in the circumferential direction on the vehicle body forward side and in the circumferential direction on the vehicle body rear side is possible, and thus the cooling ability may be changed between the vehicle body forward and rear sides of the case 1.

Even in the case of the electric rotating machine according to the second embodiment, as in the case of the electric rotating machine according to the first embodiment, flow rate adjustment may be performed using the opening area ratio by changing the inside diameters of the through-holes 19A, 19B, and 19C.

Other Embodiments

The present invention is not limited to the above-described embodiments.

For example, the number of ribs 14, the separation dimensions between the ribs 14 (that is, rib interval), flow rate distribution of the cooling fluid in the axial direction and the circumferential direction may be appropriately set depending on the temperature distribution of the case 1.

The electric rotating machine is not limited to the motor, and may also be a generator or a motor generator.

The cooling fluid is not limited to the cooling water and may also be a cooling liquid or cooling gas.

INDUSTRIAL APPLICABILITY

According to the present invention, a case of an electric rotating machine capable of reducing cost while achieving an increase in rigidity and prevention of surface vibration, and of easily controlling the flow of a cooling fluid is obtained.

REFERENCE SIGNS LIST 1 case
2 cooling passage
4 cooling water inlet hole (cooling fluid inlet)
6 cooling water outlet hole (cooling fluid outlet)
12 inside wall portion (wall portion on inside in radial direction of cooling passage)
13 outside wall portion (wall portion on outside in radial direction of cooling passage)
14, 14A, 14B, 14C rib
15 opening (second opening)

The invention claimed is:

1. A case of an electric rotating machine, which is disposed on an outer peripheral side of a stator of an internal rotor type electric rotating machine and which has a cylindrical shape, the case comprising:
a cooling passage which is provided inside the case along a circumferential direction of the case and through which a cooling fluid is able to flow;
a cooling fluid inlet and a cooling fluid outlet which communicate with the cooling passage; and
a rib which is provided inside the cooling passage, connects a wall portion on an inside in a radial direction of the case and a wall portion on an outside in the radial direction of the case, along the circumferential direction, and partitions the cooling passage into plural cooling passages,
wherein the rib partitions the cooling passage into a first cooling passage which is disposed on one end of the case in an axial direction and is directly adjacent to the cooling fluid inlet, and a second cooling passage that is adjacent to the first cooling passage, and
wherein cooling fluid that flows from the cooling fluid inlet flows directly into the first cooling passage, and a center axis of the cooling fluid inlet being disposed so as to extend from one side to the other side of the case in the axial direction, and
wherein the rib has a first opening that is disposed around the center axis of the cooling fluid inlet, the first opening penetrates through the rib in a direction along the center axis from one side of the rib in the direction along the center axis to the other side of the rib in the direction along the center axis and the first opening forms a fluid flow passage between the first cooling passage and the second cooling passage.

2. The case of the electric rotating machine according to claim 1,
wherein opening area of the first opening is smaller than opening area of the cooling fluid inlet.

3. The case of the electric rotating machine according to claim 2,
wherein the rib has a second opening that penetrate from the one side of the case in the axial direction to the other side of the case in the axial direction in the cooling passage, at position in the circumferential direction between the cooling fluid inlet and the cooling fluid outlet, and
the case further comprises expansion chambers which communicate with the second opening and are formed so as to swell out toward the outside of the radial direction, are provided.

4. The case of the electric rotating machine according to claim 1,
wherein the rib has a second opening that penetrate from the one side of the case in the axial direction to the other side of the case in the axial direction in the cooling passage, at position in the circumferential direction between the cooling fluid inlet and the cooling fluid outlet, and
the case further comprises expansion chambers which communicate with the second opening and are formed so as to swell out toward the outside of the radial direction, are provided.

5. A case of an electric rotating machine, which is disposed on an outer peripheral side of a stator of an internal rotor type electric rotating machine and which has a cylindrical shape, the case comprising:
a cooling passage which is provided inside the case along a circumferential direction of the case and through which a cooling fluid is able to flow;
a cooling fluid inlet and a cooling fluid outlet which communicate with the cooling passage; and a plurality of ribs which are provided inside the cooling passage, each of the plurality of ribs connects a wall portion on an inside in a radial direction of the case and a wall portion on an outside in the radial direction of the case, along the circumferential direction, and partition the cooling passage into a plurality of cooling passages, wherein the cooling fluid inlet communicates with the cooling passage which is disposed on one end of the case in an axial direction from among the cooling passages partitioned by the plurality of ribs, a center axis of the cooling fluid inlet being disposed so as to extend from one side to the other side of the case in the axial direction, and wherein each of the plurality of ribs is respectively provided with a first opening that is disposed around the center axis of the cooling fluid inlet such that adjacent ribs respectively have the first opening, and the first openings penetrate through the respective ribs in a direction along the center axis from one side of the respective ribs in the direction along the center axis to the other side of the respective ribs in the direction along the center axis.

6. The case of the electric rotating machine according to claim 5, wherein centers of the first openings respectively provided in the ribs are gradually shifted in the circumferential direction from a first opening of a rib disposed on one side of the case in the axial direction to a first opening of a rib disposed on an other side of the case in the axial direction.

7. The case of the electric rotating machine according to claim 5, wherein opening areas of the first openings decrease from a first opening of a rib disposed on one side of the case in the axial direction to a first opening of a rib disposed on the other side of the case in the axial direction, wherein each of the plurality of ribs respectively has a second opening that penetrates from the one side of the rib in the axial direction to the other side of the rib in the axial direction in the cooling passage, at a position in the circumferential direction between the cooling fluid inlet and the cooling fluid outlet, and the case further comprises expansion chambers which communicate with the respective second openings and are formed so as to swell out toward the outside of the radial direction.

8. The case of the electric rotating machine according to claim 5, wherein centers of the first openings respectively provided in the ribs are gradually shifted in the circumferential direction from a first opening of a rib disposed on the one side of the case in the axial direction to a first opening of a rib disposed on the other side of the case in the axial direction, wherein each of the plurality of ribs respectively has a second opening that penetrates from the one side of the rib in the axial direction to the other side of the rib in the axial direction in the cooling passage, at a position in the circumferential direction between the cooling fluid inlet and the cooling fluid outlet, and the case further comprises expansion chambers which communicate with the respective second openings and are formed so as to swell out toward the outside of the radial direction.

9. The case of the electric rotating machine according to claim 5, wherein opening areas of the first openings decrease from a first opening of the rib disposed on one side of the case in the axial direction to a first opening of a rib disposed on the other side of the case in the axial direction, and wherein respective opening areas of the first openings are smaller than an opening area of the cooling fluid inlet.

10. The case of the electric rotating machine according to claim 5, wherein centers of the first openings respectively provided in the ribs are gradually shifted in the circumferential direction from a first opening of a rib disposed on one side of the case in the axial direction to a first opening of a rib disposed on the other side of the case in the axial direction, and wherein respective opening areas of the first openings are smaller than an opening area of the cooling fluid inlet.

11. The case of the electric rotating machine according to claim 5, wherein opening areas of the first openings decrease from a first opening of a rib disposed on one side of the case in the axial direction to a first opening of a rib disposed on the other side of the case in the axial direction, wherein respective opening areas of the first openings are smaller than an opening area of the cooling fluid inlet, wherein each of the plurality of ribs respectively has a second opening that penetrates from one side of the rib in the axial direction to the other side of the rib in the axial direction in the cooling passage, at position in the circumferential direction between the cooling fluid inlet and the cooling fluid outlet, and the case further comprises expansion chambers which communicate with the respective second openings and are formed so as to swell out toward the outside of the radial direction, are provided.

12. The case of the electric rotating machine according to claim 5, wherein centers of the first openings respectively provided in the ribs are gradually shifted in the circumferential direction from a first opening of the rib disposed on one side of the case in the axial direction to a first opening of a rib disposed on the other side of the case in the axial direction, wherein respective opening areas of the first openings are smaller than an opening area of the cooling fluid inlet, wherein each of the plurality of ribs respectively has a second opening that penetrates from one side of the rib in the axial direction to the other side of the rib in the axial direction in the cooling passage, at position in the circumferential direction between the cooling fluid inlet and the cooling fluid outlet, and the case further comprises expansion chambers which communicate with the respective second openings and are formed so as to swell out toward the outside of the radial direction, are provided.

13. The case of the electric rotating machine according to claim 5, wherein opening areas of the first openings decrease from a first opening of a rib disposed on one side of the case in the axial direction to a first opening of a rib disposed on an other side of the case in the axial direction.

* * * * *